United States Patent [19]

Zenthoefer

[11] 4,068,907

[45] Jan. 17, 1978

[54] PULLEY MOUNTING

[76] Inventor: Edwin A. Zenthoefer, 3860 Londell Road, Arnold, Mo. 63010

[21] Appl. No.: 753,909

[22] Filed: Dec. 23, 1976

[51] Int. Cl.² .................................................. F16H 55/00
[52] U.S. Cl. .................................. 308/18; 74/230.01; 74/230.3; 308/34; 308/208; 403/26
[58] Field of Search ....................... 308/18, 27, 34, 35, 308/202, 208, 207 R, 210; 403/26; 74/230.01, 230.3; 301/112, 122

[56] References Cited

FOREIGN PATENT DOCUMENTS

| 517,641 | 2/1953 | Belgium | 74/230.01 |
| 256,771 | 1/1927 | Italy | 74/230.01 |
| 933,630 | 8/1963 | United Kingdom | 308/208 |

Primary Examiner—Trygve M. Blix
Assistant Examiner—Charles E. Frankfort
Attorney, Agent, or Firm—Ralph W. Kalish

[57] ABSTRACT

The combination with a housing or casing having an opening for projection outwardly therethrough of a shaft, the opening being of greater diameter than the shaft and rigidly receiving a mounting projecting beyond the casing and having a bore for journalling of the shaft, an inner bearing race fixedly engaged upon the mounting exteriorly of the casing for accommodating a plurality of discrete bearings, an outer race engaged to the shaft for rotation therewith, and a pulley or wheel member fixed on the outer race radially outwardly of the fixed inner race and mounting member.

6 Claims, 4 Drawing Figures

PULLEY MOUNTING

BACKGROUND AND SUMMARY OF THE INVENTION

This invention relates in general to mounting systems for pulleys and the like and, more particularly, to a pulley mounting system wherein the forces generated by the pulley in operation are supported by a motor casing wall as distinguished from the shaft.

The present invention contemplates a manner for supporting a pulley for rotation as for motion transmission purposes and the like wherein the forces developed by the pulley during operation, such as of centripetal nature and as customarily borne by the shaft, are transmitted to the motor, gearbox, or the like housing and thereby substantially bypass the shaft.

Therefore, it is an object of the present invention to provide a pulley mounting which is adapted to eliminate the subjection of the shaft to the normal forces developed by a pulley during operation so as to thereby conduce to the longevity and reliable operation of the shaft.

It is another object of the present invention to provide a pulley mounting incorporating novel elements for transmitting the forces generated by the pulley during operation to the casing from which the shaft projects, such as for a motor or gearbox or the like.

It is a still further object of the present invention to provide a pulley mounting of the character stated which comprises a paucity of elements, all of which are of sturdy construction and which may be easily assembled without the exercise of highly trained individuals.

It is a further object of the present invention to provide a pulley mounting of the character stated which may be most economically manufactured; wherein the parts are easily assembled; and with the operation of the same being extremely durable.

DESCRIPTION OF THE PREFERRED EMBODIMENT

Figure 4:
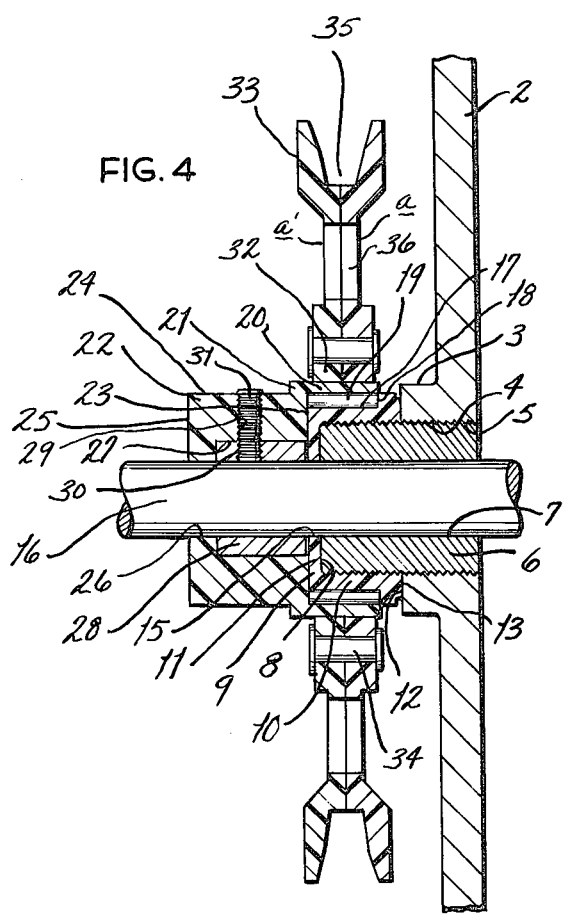
FIG. 4 is a vertical transverse sectional view taken on the line 4—4 of FIG. 2, but showing the shaft in full lines.

Referring now by reference characters to the drawings which illustrate the preferred embodiment of the present invention, 1 designates a side wall of a casing or housing c, such as utilized for prime movers, gearboxes and the like; while the numeral 2 indicates one end wall thereof, which latter incorporates a projecting annular boss 3 provided with a threaded opening 4 registering with a similarly internally threaded opening 5 in said wall 2 (see FIG. 4). Fixedly received within aligned openings 4,5 is the inner end portion of an externally threaded sleeve-like mounting 6 having an axial bore 7. Said mounting 6 projects beyond boss 3 exteriorly of casing c for extension into the casing directed recess 8 of a cup-like fitting 9 which latter includes a cylindrical flange 10 with the latter being internally threaded for engaging the external threads of said mounting 6. The end face of mounting 6 abuts snugly against the base wall or web 11 of fitting 9. The depth of flange 10 is such that the web-remote face 12 of fitting 9 tightly abuts against the confronting face 13 of boss 3 whereby fitting 9, mounting 6, and casing c are intimately secured in substantially rigid condition. Axial bore 7 of mounting 6 registers with a bearing-forming opening 15 in fitting web 11 for accommodating a shaft 16 projecting outwardly from the interior of casing c, such as from a prime mover.

Flange 10 of fitting 9 is externally recessed, as at 17, from web 11 to an annular shoulder 18 formed spacedly from end face 12, which recess 17 constitutes the inner race for relatively short, narrow roller bearings 19 which are thus limited by shoulder 18 from axial movement toward casing c. Said bearings 19 are contained by an outer race 20 developed by the inward face of an annular extension or skirt 21 integral with and projecting from the body of a generally cylindrical end closure 22; said extension 21 being radially offset therefrom. Said closure 22 at the outer end of extension 21 is provided with a flat, casing-directed face 23 which abuts snugly against the confronting face of web 11 of fitting 9 as well as providing a limit for said roller bearings 19 so as to inhibit undesired axial displacement of said bearings in a direction away from said casing.

Figure 1:
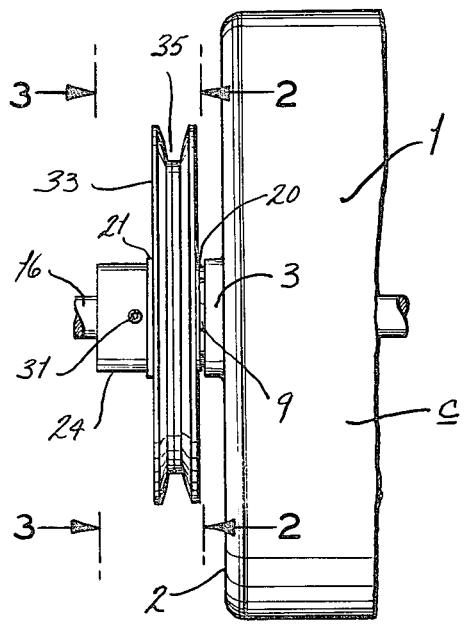
FIG. 1 is a side elevational view of a pulley mounting constructed in accordance with and embodying the present invention.
Figure 2:
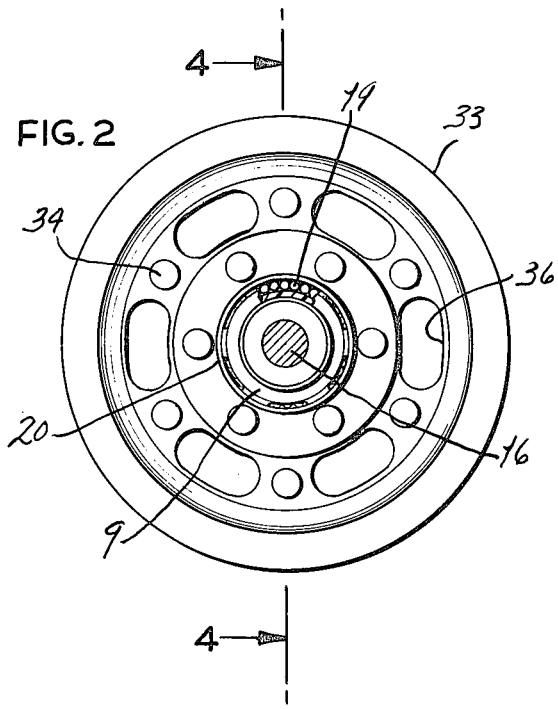
FIG. 2 is a vertical view, in partial section, taken on the line 2—2 of FIG. 1.
Figure 3:
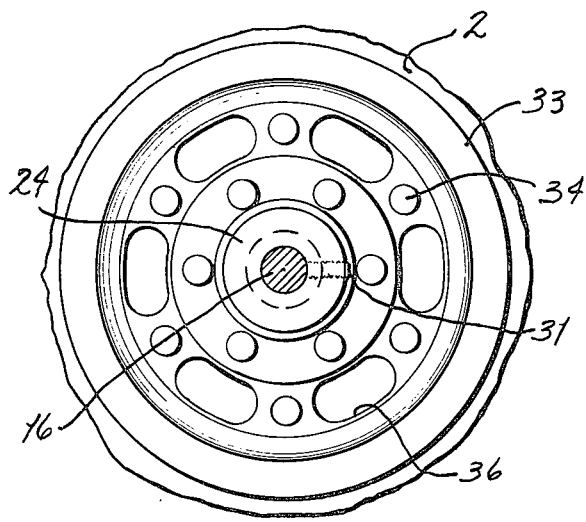
FIG. 3 is a vertical view, in partial section, taken on the line 3—3 of FIG. 1.

Closure 22 includes a generally cylindrical body portion 24 terminating in an end wall 25 parallel to the casing directed face 23. Closure body 24 is provided with a bore 26 opening through end wall 25 and internally in communication with a counterbore 27 which latter opens through said face 23. Snugly received within counterbore 27 is a wear bushing 28, the bore of which is coaxial with, and of like diameter as, bores 7, and 26, as well as opening 15 for journalling of shaft 16. Provided in closure 22 spacedly from end wall 25 is a radially extending tapped aperture 29 aligned with a similarly tapped opening 30 in bushing 28 for engaging a set screw 31 which latter at its inner end tightly abuts against shaft 16 (see FIGS. 3 and 4) for interengaging same to closure 22 which as pointed out above is integral with the outer race 20 for bearings 19 so that upon rotation of shaft 16 through the particular source of power, closure 22 will be caused to rotate and with outer race 20 thus moving relatively with respect to said bearings 19.

Suitably mounted, as by keying or otherwise, upon the radially outwardly directed face of extension 21 of closure 22 is the hub portion 32 of a pulley 33 which, as illustrated, may desirably be composed of two mating parts a,a' but, understandably, could be of unitary construction with such parts a,a' being secured by a plurality of angularly disposed rivets 34. Pulley 33 which is merely exemplary of a wheel structure to be rotated by shaft 16 embodies the usual circumferentially outwardly opening groove 35 for receiving a transmission belt, chain, or the like, as the case may be. Immediately radially inwardly of said groove 35 pulley 33 may be provided with a series of weight-reducing openings, as indicated at 36 (see FIGS. 3 and 4).

It will thus be seen from the foregoing that pulley 33 is in mounted disposition directly upon end closure 22 which is interconnected by set screw 31 to shaft 16 so that rotative movement is transmitted to pulley 33 through the angular travel of end closure 22 as outer race 20 moves relatively about bearings 19. However, such rotation of pulley 33 is directly supported through bearings 19, fitting 9, mounting member 6, and thence to casing c. Thus, by the novel arrangement of the present invention pulley 33 or such other type wheels as might be used is not mounted directly upon shaft 19 so as to transmit thereto any forces generated through travel of said pulley, such as of a centripetal nature or the like, as well as eliminating the potential for any wear of the means for interconnecting shaft 16 and pulley 33. Thus, pulley 33 is supported by casing c and is thereby accorded maximum strength under the particular circumstances obtaining for support of its rotation which conduces to longevity of the system by protecting shaft 16 against the forces normally encountered so that inadvertent breakdown or damage with attendant costly down time for repair or part replacement is avoided. The simplicity of the present invention renders same highly versatile for myriad usages without occasioning costly modification of existing constructions. As pointed out above the precise construction of pulley 33 is not critical to the present invention, but the same is used for purposes of illustration.

Having described my invention what I claim and desire to obtain by Letters Patent is 1. The combination with a casing having an opening in one portion thereof and a shaft of lesser diameter than said casing opening projecting outwardly therethrough, of a wheel mounting means comprising a mounting member fixed within said casing opening and projecting outwardly therebeyond, said mounting member having a bore through which said shaft extends, a fitting fixedly engaged on said mounting member in its projecting portion, a multiplicity of bearing elements arranged circumferentially about, and supported upon, said fitting, said fitting having a bearing for journalling of said shaft extending therethrough, means disposed radially outwardly of said fitting for retaining said bearing elements against displacement from operative position, a wheel having a hub portion, said hub portion being engaged upon said means retaining said bearing elements, and means interconnecting said shaft and said bearing element retaining means.

2. The combination as defined in claim 1 and further characterized by said mounting member being externally threaded, said fitting having an annular, internally threaded flange for engagement upon the projecting portion of said mounting member, said multiplicity of bearing elements being arranged circumferentially about the outer face of said fitting flange, said fitting having a web abutting against a confronting portion of said mounting member and said fitting bearing being provided in said fitting web.

3. The combination as defined in claim 2 and further characterized by said bearing elements being discrete roller bearings, cooperative means provided on said fitting and said means retaining said bearing elements in opposed relationship for inhibiting displacement of said roller bearings in axial directions.

4. The combination as defined in claim 3 and further characterized by said means retaining said bearing elements comprising a closure having an annular extension at its casing adjacent end for disposition radially outwardly of said bearing elements in opposed relationship to the support therefor for retaining said elements within an arrangement surrounding, but spaced from, said shaft, bearing means provided in said closure for said shaft, and means interconnecting said closure and said shaft, said wheel hub portion being engaged upon said annular extension radially outwardly of said bearing elements.

5. The combination as defined in claim 3 and further characterized by said closure having a body portion, said annular extension projecting from the casing adjacent end of said body portion, said closure having a bore for journalling of said shaft therethrough, and shaft engaging wear means provided internally of said closure.

6. The combination as defined in claim 2 and further characterized by said bearing elements being discrete roller bearings arranged in an annular pattern surroundingly of and concentric with said shaft, said means for retaining said bearing elements against displacement from operative position comprising a closure, said closure being located on the casing remote side of said fitting and having at its casing adjacent end an endwise projecting annular extension surroundingly of said bearing elements for restraining same against radially outward displacement, said means interconnecting said shaft and said bearing element retaining means being cooperative securing elements engaging said shaft to said closure, and said hub portion being engaged upon the outwardly directed face of said annular extension whereby upon rotation of said shaft rotative movement will be transmitted from said shaft to said wheel through said closure.

* * * * *